(12) United States Patent
Scheer

(10) Patent No.: US 6,285,093 B1
(45) Date of Patent: Sep. 4, 2001

(54) HYDROSTATIC TRANSMISSION CONTROL CIRCUIT

(75) Inventor: Glenn Owen Scheer, Durango, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/489,455

(22) Filed: Jan. 21, 2000

(51) Int. Cl.[7] .................................................. H02B 1/24
(52) U.S. Cl. ............................................................ 307/115
(58) Field of Search .................................... 307/112, 113, 307/115, 116, 125

(56) References Cited

U.S. PATENT DOCUMENTS

| | | | |
|---|---|---|---|
| 4,095,071 | 6/1978 | Chamberlain | 200/157 |
| 4,360,718 | 11/1982 | Schobinger et al. | 200/61.88 |
| 5,244,066 | 9/1993 | Mackoway et al. | 192/13 |
| 5,456,333 | 10/1995 | Brandt et al. | 180/336 |
| 5,566,586 | 10/1996 | Lauer et al. | 74/523 |

OTHER PUBLICATIONS

Deere & Company Brochure entitled Crawler Dozers 550H, cover and pp. 2, 4–5, 10–11, and back page, printed in the U.S.A., Sep. 1999.

*Primary Examiner*—Edward H. Tso

(57) ABSTRACT

An electrical control circuit for supplying an analog voltage signal to an electronic transmission controller for a hydrostatic transmission. The control circuit comprises two switches located on a T-bar handle of a control lever. The first switch is closed for reducing the speed of the vehicle and the second switch is closed for increasing the speed of the vehicle. The circuit is provided with a constant direct current voltage source. A first resistor is mounted in series with the voltage source. A second resistor in turn is mounted in series with the first resistor. The first switch is mounted in parallel with second resistor. A third resistor is mounted in series with the second resistor downstream from the first resistor. The third resistor is coupled to ground. The second switch is mounted in series with the second resistor downstream from the first resistor. A fourth resistor is mounted in series with the second switch. The second switch and fourth resistor are mounted in parallel to the third resistor. A voltage signal output is located between the second and third resistors and supplies an analog voltage signal to the electronic transmission controller.

16 Claims, 3 Drawing Sheets

HYDROSTATIC TRANSMISSION CONTROL CIRCUIT

BACKGROUND OF THE INVENTION

1. Field of the Invention

The present invention is directed to an electrical control circuit for providing an analog voltage signal to an electronic transmission controller for a hydrostatic transmission.

2. Description of the Prior Art

Hydrostatic transmissions are becoming increasingly common in off road work vehicles. Electronic transmission controllers have been used to control the operation of the hydrostatic transmission. These controllers receive an analog voltage signal from the operator to control the output of the transmission. In a system currently marketed by the assignee of the present invention, the system uses two levers to control the operation of the transmission. The first lever is used to control steering and the forward and reverse movement of the vehicle. The maximum desired speed of the vehicle is controlled by a separate lever.

Single lever shift levers for off road work vehicles have been proposed which have a knob that can be rotated to signal different speed ratios. The knob may also be provided with a rocker switch which is used to shift the transmission between forward and reverse, see U.S. Pat. No. 4,360,718. In addition, a steering lever for an off road work vehicle has also been proposed having keys for shifting the transmission into forward and reverse. Other keys are provided for higher or lower speed levels, see U.S. Pat. No. 5,566,586.

SUMMARY

The present invention is directed to an electrical control circuit for supplying an analog voltage signal to an electronic transmission controller for a hydrostatic transmission. The control circuit comprises two switches located on a T-bar handle of a control lever. The control lever is used to control steering and the forward and reverse operation of the vehicle. The circuit is provided with two switches a first switch for reducing the speed of the vehicle and a second switch for increasing the speed of the vehicle. The switches are normally open and depressing the first switch closes the switch and reduces the speed of the vehicle. Depressing the second switch closes that switch and increases the speed of the vehicle.

The circuit is provided with a constant direct current voltage source. A first resistor is mounted in series with the voltage source. A second resistor in turn is mounted in series with the first resistor. The first switch is mounted in parallel with second resistor. A third resistor is mounted in series with the second resistor downstream from the first resistor. The third resistor is coupled to ground. The second switch is mounted in series with the second resistor downstream from the first resistor. A fourth resistor is mounted in series with the second switch. The second switch and fourth resistor are mounted in parallel to the third resistor. A voltage signal output is located between the second and third resistors and supplies an analog voltage signal to the electronic transmission controller.

In the preferred embodiment the first and second resistors have approximately the same resistance. Both the first and second resistors individually have a smaller resistance than the third resistor. In addition, the first and second resistors combined have a smaller resistance than the third resistor. The fourth resistor is smaller than the both the first and second resistors individually. Through this arrangement of resistances the voltage output of the circuit has three distinct control bands. In the neutral band with both switches open an analog voltage signal is emitted in the neutral voltage band. In the neutral voltage band electrical current from the voltage source passes through the first, second and third resistors resulting in a voltage signal at the voltage signal output in the neutral voltage band. In response to this signal the electronic transmission controller maintains the vehicle at its current operating speed. Closing the first switch signals a desired speed reduction as an analog voltage signal is emitted in the down voltage band. The down voltage band has a higher voltage than the neutral voltage band as the closed first switch allows the current to bypass the second resistor. The electronic transmission controller uses this signal to deaccelerate the vehicle. Closing the second switch signals a desired speed increase as an analog voltage signal is emitted in the up voltage band. The up voltage band has a lower voltage than the neutral voltage band as the closed second switch allows current to pass through the fourth resistor to ground. The electronic controller uses this signal to accelerate the vehicle.

In addition to the control bands, neutral, down and up, two other bands indicating an open circuit to ground and a short circuit when both switches are depressed. In the open circuit to ground condition, current passes through the first and second resistors and then passes to ground through a fifth resistor located in the electronic transmission controller. As this fifth resistor is larger than the third resistor the open circuit analog voltage signal band is greater than the down control signal band. If both switches are depressed the second resistor is bypassed as the first switch is closed and the fourth resistor provides a current path as the second switch is depressed. This configuration results in a up/down analog signal voltage band having a voltage that is smaller than the voltage of the neutral voltage band and larger than the voltage of the up voltage band.

DETAILED DESCRIPTION

Figure 1:
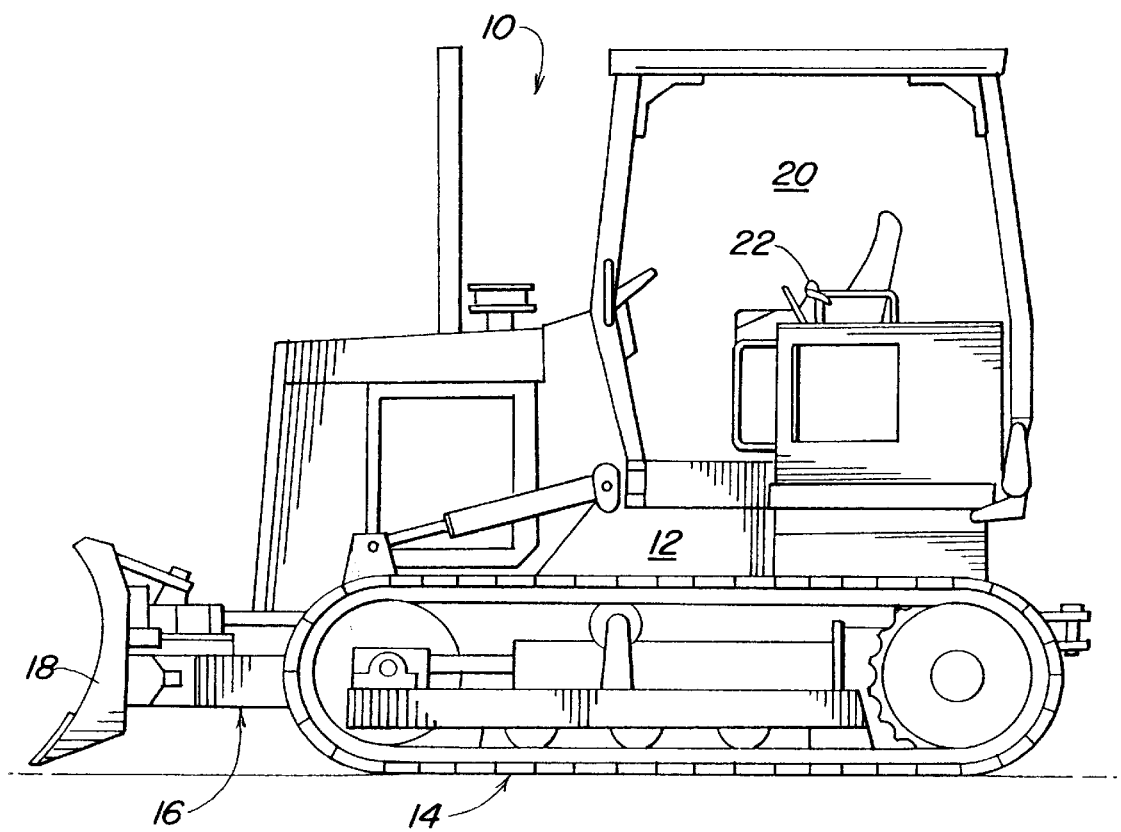
FIG. 1 is a side view of a work vehicle.
Figure 2:
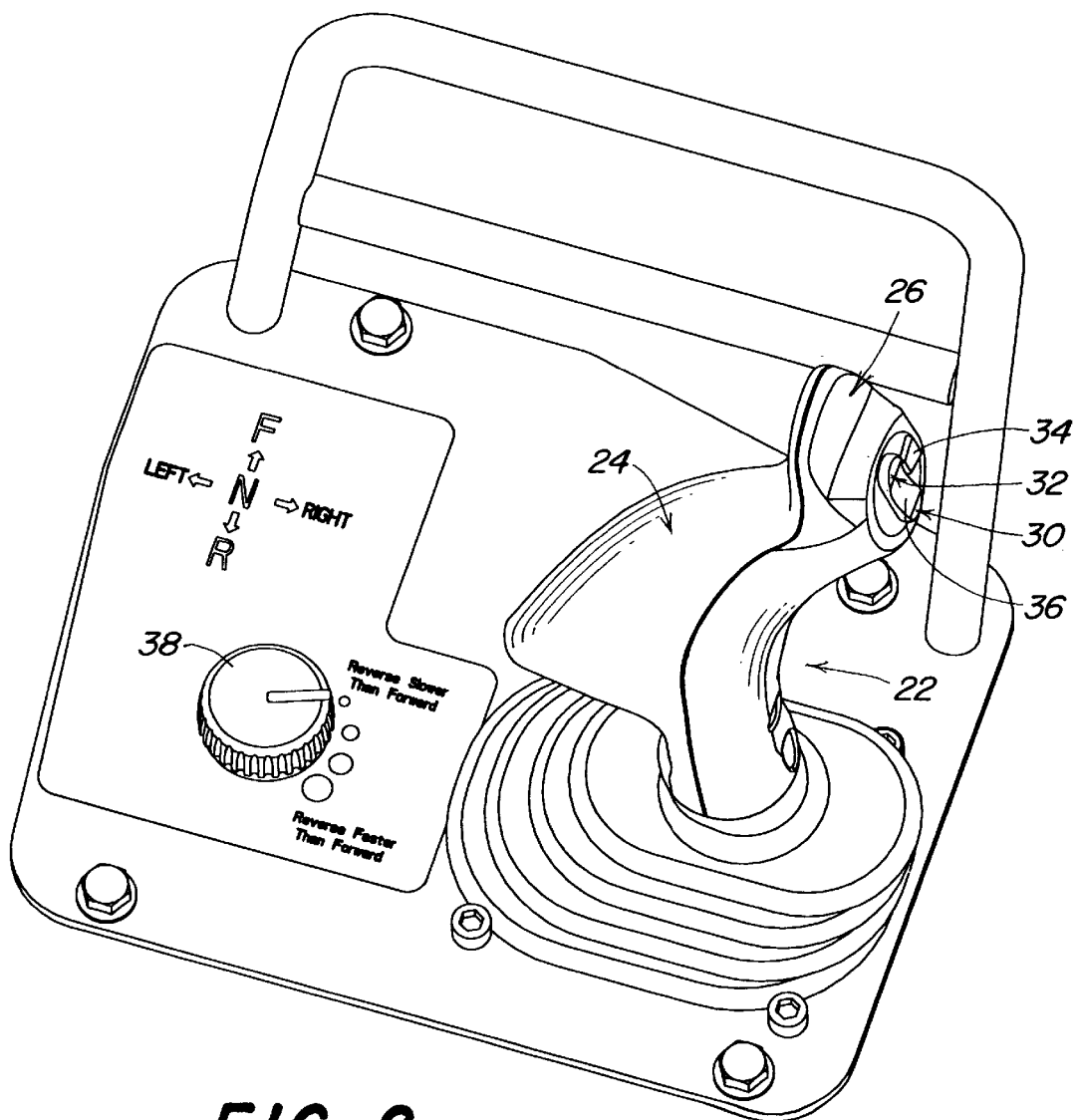
FIG. 2 is a perspective view of the control handle having speed control switches mounted thereon.

FIG. 1 is a side view of an off-road work vehicle 10. In the illustrated embodiment this comprises a tracked bulldozer. The vehicle broadly comprises a frame 12 from which extends tracks 14 for supporting and propelling the vehicle across a field. Although not illustrated the vehicle is provided with a dual path hydrostatic transmission for independently propelling each of the tracks. The front of the vehicle is provided with suitable linkage 16 for manipulating bulldozer blade 18. The operation of the vehicle and the bulldozer blade are controlled from operator's station 20. The left side of the operators station 20 is provided with a vehicle control lever 22 which is electronically coupled to the hydrostatic transmission for steering the vehicle and propelling the vehicle in forward or reverse. The control handle 22 is a T-bar handle having a transversely extending body portion 24 and an upwardly extending thumb rest portion 26. Moving the handle fore-and-aft propels the vehicle in the forward or reverse directions, respectively. Moving the handle 22 to the right or to the left steers the vehicle to the right or to the left. The thumb rest portion 26 of the handle is provided with three switches 30, 32 and 34. The first switch 30 is depressed to deaccelerate the vehicle, whereas the second switch 32 is used to accelerate the vehicle. The third switch 34 is a horn button. Although the present invention is illustrated as being used on a conventionally steel tracked bulldozer it can be used on wheeled work vehicles or rubber tracked work vehicles. All of the switches are normally biased open and are depressed to activate the selected function.

The control panel is also provided with a dial 38 for electronically changing the sensitivity of the forward and reverse inputs of the control lever.

Figure 3:
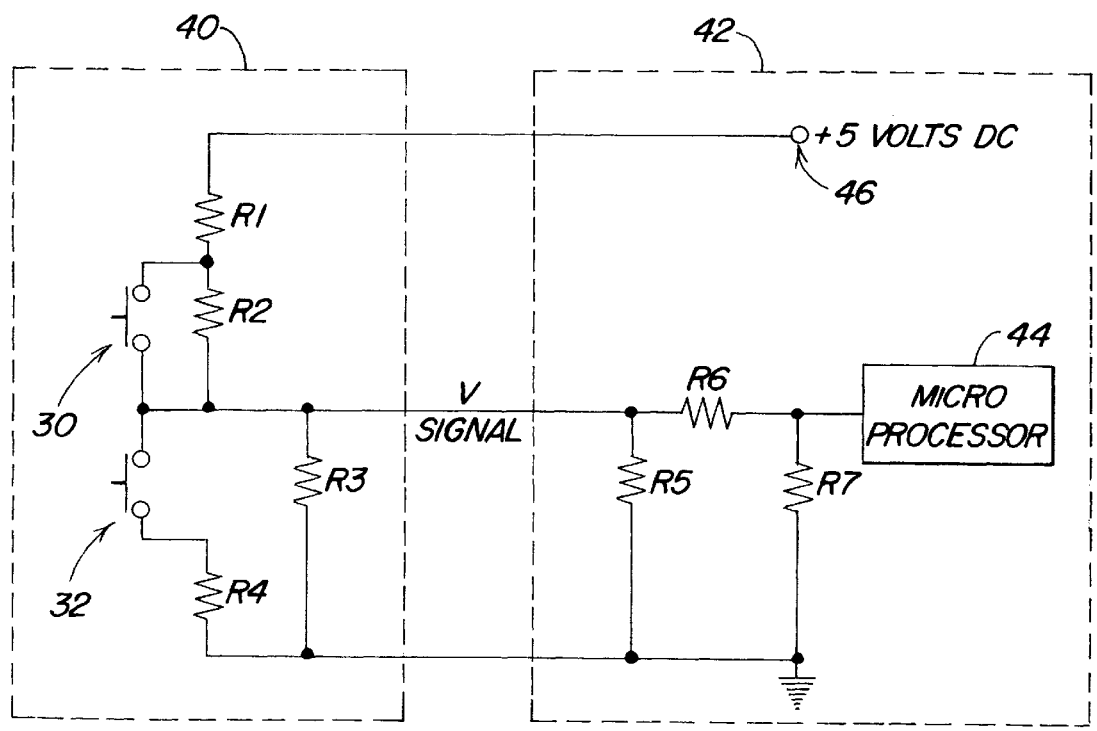
FIG. 3 is an electrical schematic of the electrical control circuit.

The first and second switches 30 and 32 may be formed into a single rocker switch 36. The electrical schematic for the control circuit 40 is best illustrated in FIG. 3. The control circuit 40 is electrically coupled to electronic transmission controller 42 having a microprocessor 44. In response to analog voltage signals from the controller the controller either maintains the current speed of the vehicle, slows down the vehicle or speeds up the vehicle.

The control circuit 40 is provided with a constant voltage source 46 from the electronic transmission controller 42. A first resistor R1 is mounted in series with the voltage source 46. A second resistor R2 in turn is mounted in series with the first resistor. The first switch 30 is mounted in parallel with second resistor R2. A third resistor R3 is mounted in series with the second resistor R2 downstream from the first resistor R1. The third resistor R3 is coupled to ground through the electronic transmission controller 42. The second switch 32 is mounted in series with the second resistor R2 downstream from the first resistor R1. A fourth resistor R4 is mounted in series with the second switch 32. The second switch 32 and fourth resistor R4 are mounted in parallel to the third resistor R3. A voltage signal output V SIGNAL is located between the second and third resistors R2 and R3 and supplies an analog voltage signal to the electronic transmission controller 42.

The electronic transmission controller 42 is provided with a fifth resistor R5 extending between the V SIGNAL line and ground. The fifth resistor R5 is mounted in parallel with the third resistor R3. In addition, the controller 42 is also provided with a sixth resistor R6 that is positioned in series between the V SIGNAL line and the microprocessor. A seventh resistor R7 is mounted in parallel with the fifth resistor R5 and the third resistor R3.

In one example of the preferred embodiment, the voltage source supplies 5 volts DC. The first and second resistors R1 and R2 have approximately the same nominal resistance of 82 ohms. The third resistor R3 has a larger nominal resistance of 180 ohms which is larger than the nominal resistances of the first and second resistors R1 and R2. The fourth resistor R4 with a nominal resistance of 50 ohms is smaller than the both the first and second resistors R1 and R2. Through this arrangement of resistances, the voltage output V SIGNAL of the circuit has three distinct control bands. In the neutral band, with both switches 30 and 32 open, an analog voltage signal V SIGNAL is emitted in the neutral voltage band. In the neutral configuration with both switches 30 and 32 open, electrical current from the voltage source passes through the first, second and third resistors R1, R2 and R3 resulting in a voltage signal at the voltage signal output V SIGNAL in the neutral voltage band. In response to this signal the electronic transmission controller 42 maintains the vehicle at its current speed. With a ten percent resistance variance, the neutral voltage band is between 2.02 and 2.45 volts. Closing the first switch 30 signals a desired speed reduction as an analog voltage signal output V SIG-NAL is emitted in the down voltage band. The down voltage band has a higher voltage than the neutral voltage band as the closed first switch 30 allows the current to bypass the second resistor R2. The electronic transmission controller 42 uses this signal to deaccelerate the vehicle. With a ten percent resistance variance, the down voltage band is between 2.88 and 3.29 volts. Closing the second switch 32 signals a desired speed increase as an analog voltage signal V SIGNAL is emitted in the up voltage band. The up voltage band has a lower voltage than the neutral voltage band as the closed second switch 32 allows current to pass through the fourth resistor R4 to ground. The electronic transmission controller 42 uses this signal to accelerate the vehicle. With a ten percent resistance variance, the up voltage band is between 0.77 and 1.06 volts In addition to the control voltage bands, neutral, down and up, two other voltage bands indicating an open circuit to ground and a short circuit when both switches 30 and 32 are closed. In the open circuit to ground condition, current passes through the first and second resistors R1 and R2 and then passes to ground through the fifth resistor R5 located in the electronic transmission controller 42. The fifth resistor R5 has a nominal resistance of 500 ohms. As the fifth resistor R5 is larger than the third resistor R3 the open circuit voltage band is greater than the down voltage band. With a ten percent resistance variance, the open circuit voltage band is between 3.68 and 3.86 volts. If both switches are depressed the second resistor R2 is bypassed as the first switch 30 is closed and the fourth resistor R4 provides a current path as the second switch 32 is depressed. This configuration results in a up/down voltage band having a voltage that is smaller than the neutral voltage band and larger than the voltage of the up voltage band. With a ten percent resistance variance, the up/down voltage band is between 1.34 and 1.74 volts.

In the above described example, the sixth resistor R6 has a nominal resistance of 10,000 ohms and the seventh resistor R7 has a nominal resistance of 100,000 ohms.

These voltage bands provide distinct analog input signals to the microprocessor for controlling the hydrostatic transmission.

The present invention should not be limited by the above described embodiment, but should be limited solely by the claims that follow.

What is claimed is:

1. An electrical control circuit for signaling an electronic transmission controller with a voltage variable signal, the control circuit comprising:

a voltage source;

a first resistor coupled to the voltage source;

a second resistor mounted in series with the first resistor downstream from the voltage source;

a first switch mounted in parallel, with the second resistor;

a third resistor is mounted in series with the second resistor downstream from the first resistor, the third resistor being coupled to ground;

a second switch is mounted in series with the second resistor downstream from the first resistor;

a fourth resistor is mounted in series with the second switch, the second switch and fourth resistor are mounted in parallel to the third resistor;

a voltage signal output is located between the second and third resistors.

2. An electrical control circuit as defined by claim 1 wherein the first and second switches are normally open.

3. An electrical control circuit as defined by claim 2 wherein the voltage source is a direct current voltage source.

4. An electrical control circuit as defined by claim 3 wherein the first and second resistors have substantially the same resistance.

5. An electrical control circuit as defined by claim 3 wherein the fourth resistor has a smaller resistance than the second resistor.

6. An electrical control circuit as defined by claim 3 wherein the fourth resistor has a smaller resistance than the first resistor.

7. An electrical control circuit as defined by claim 3 wherein the fourth resistor has a smaller resistance that the first and second resistors, individually.

8. An electrical control circuit as defined by claim 7 wherein the third resistor has a greater resistance than the first, second and fourth resistors, individually.

9. An electrical control circuit as defined by claim 3 wherein the first and second switches comprise a rocker switch that is coupled to a control handle of a work vehicle.

10. An electrical control circuit as defined by claim 9 wherein the control handle has a transverse body portion which is provided with an upstanding thumb rest portion on which the rocker switch is mounted.

11. An electrical control circuit as defined by claim 9 wherein the control handle controls steering and the forward and rearward movement of a work vehicle.

12. An electrical control circuit for signaling an electronic transmission controller with a voltage variable signal, the control circuit comprising:

a first switch for deaccelerating the vehicle;

a second switch for accelerating the vehicle;

whereby said electrical control circuit produces an analog voltage signal that is directed to the electronic transmission controller in a neutral voltage band when both switches are open, in a down voltage band when the first switch is closed, and in an up voltage band when the second switch is closed, the neutral, down and up voltage bands are distinct from one another.

13. An electrical control circuit as defined by claim 12 whereby said electrical control circuit produces an analog voltage signal in an up/down voltage band when both switches are closed together, the up/down voltage band being distinct from the neutral, the up and the down voltage bands.

14. An electrical control circuit as defined by claim 13 wherein the first and second switches comprise a rocker switch that is coupled to a control handle of a work vehicle.

15. An electrical control circuit as defined by claim 14 wherein the control handle has a transverse body portion which is provided with an upstanding thumb rest portion on which the rocker switch is mounted.

16. An electrical control circuit as defined by claim 15 wherein the control handle controls steering and the forward and rearward movement of a work vehicle.

\* \* \* \* \*